| (12) | United States Patent | (10) Patent No.: | US 9,868,998 B2 |
|---|---|---|---|
| | Geach | (45) Date of Patent: | Jan. 16, 2018 |

(54) METHOD AND APPARATUS FOR SUPPLYING BLAST TO A BLAST FURNACE

(71) Applicant: PRIMETALS TECHNOLOGIES, LIMITED, London (GB)

(72) Inventor: Paul Mark Geach, Northallerton (GB)

(73) Assignee: PRIMETALS TECHNOLOGIES LTD (GB)

( * ) Notice: Subject to any disclaimer, the term of this patent is extended or adjusted under 35 U.S.C. 154(b) by 113 days.

(21) Appl. No.: 14/652,548

(22) PCT Filed: Dec. 10, 2013

(86) PCT No.: PCT/EP2013/076109
§ 371 (c)(1),
(2) Date: Jun. 16, 2015

(87) PCT Pub. No.: WO2014/095494
PCT Pub. Date: Jun. 26, 2014

(65) Prior Publication Data
US 2015/0329928 A1    Nov. 19, 2015

(30) Foreign Application Priority Data
Dec. 21, 2012    (GB) .................................... 1223135.3

(51) Int. Cl.
*C21B 7/00* (2006.01)
*C21B 9/00* (2006.01)
(Continued)

(52) U.S. Cl.
CPC .................. *C21B 5/06* (2013.01); *C21B 7/00* (2013.01); *C21B 9/10* (2013.01); *C21B 9/14* (2013.01);
(Continued)

(58) Field of Classification Search
CPC .... C21B 7/00; C21B 9/00; C21B 9/14; F27D 17/004; F27D 2017/007
(Continued)

(56) References Cited

U.S. PATENT DOCUMENTS 1,471,821 A * 10/1923 Besta ........................ F01K 1/00
122/448.3
3,061,292 A * 10/1962 Kinney ..................... C21B 9/12
432/216
(Continued)

FOREIGN PATENT DOCUMENTS

CN    1080659 A    1/1994
CN    101000141 A    7/2007
(Continued)

OTHER PUBLICATIONS

First Office Action dated Jun. 20, 2016 in corresponding Chinese Patent Application No. 201380067539.2 (English language translation)( total pages).
(Continued)

*Primary Examiner* — Gregory A Wilson
(74) *Attorney, Agent, or Firm* — Ostrolenk Faber LLP

(57) ABSTRACT

Apparatus for supplying blast to a blast furnace (1) having a plurality of hot blast stoves (4, 5, 6), each stove including a cold blast inlet, a fuel inlet, an air supply inlet, a hot blast outlet, and a waste gas outlet; a waste heat recovery unit (30) connected to a fuel supply, the stove fuel inlet and the cold blast inlet. The stove waste gas outlets are connected to the cold blast inlets, whereby stove waste gas from one stove (5) is supplied, via the waste heat recovery unit, as cold blast to another stove (4).

12 Claims, 6 Drawing Sheets

(51) Int. Cl.
*C21B 9/14* (2006.01)
*C21B 5/06* (2006.01)
*C21B 9/10* (2006.01)
*F27D 17/00* (2006.01)

(52) U.S. Cl.
CPC ............ *F27D 17/004* (2013.01); *C21B 7/002* (2013.01); *F27D 2017/007* (2013.01); *Y02P 10/122* (2015.11); *Y02P 10/128* (2015.11); *Y02P 10/265* (2015.11); *Y02P 10/283* (2015.11)

(58) Field of Classification Search
USPC .......................................................... 432/30
See application file for complete search history.

(56) References Cited

U.S. PATENT DOCUMENTS

| | | | | |
|---|---|---|---|---|
| 4,444,555 | A | * | 4/1984 | Edwardsen ............... C21B 9/06 266/44 |
| 4,877,013 | A | * | 10/1989 | Eschmann ............ F27D 17/004 126/110 R |
| 8,545,597 | B2 | | 10/2013 | Roth et al. |
| 8,834,599 | B2 | * | 9/2014 | Millner ..................... C21B 5/06 266/156 |
| 8,992,823 | B2 | * | 3/2015 | Eschmann ................ C21B 5/06 266/197 |
| 9,151,492 | B2 | * | 10/2015 | Cameron .................. F23C 9/00 |
| 2009/0308205 | A1 | * | 12/2009 | Dry ..................... C21B 13/0013 75/707 |
| 2010/0146982 | A1 | * | 6/2010 | Lanyi ...................... C21B 7/002 60/772 |
| 2012/0214116 | A1 | * | 8/2012 | Cameron .................. C21B 9/00 432/30 |

FOREIGN PATENT DOCUMENTS

| | | |
|---|---|---|
| CN | 102197147 A | 9/2011 |
| CN | 102575899 A | 7/2012 |
| DE | 42 20 489 C1 | 9/1993 |
| DE | 102005017434 A1 | 10/2006 |
| GB | 951077 | 3/1964 |
| JP | S57-52552 | 3/1982 |
| JP | S 57 137407 | 8/1982 |
| JP | S 58-39714 | 3/1983 |
| JP | S 63-140009 | 3/1983 |
| JP | S60-5815 | 1/1985 |
| JP | 09287013 | 6/1988 |
| JP | 2003254085 A | 9/2003 |
| JP | 2012 031495 | 2/2012 |
| WO | WO 2012/059255 A1 | 5/2012 |

OTHER PUBLICATIONS

Japanese Office Action, dated Jul. 25, 2016, issued in corresponding Japanese Patent Application No. 2015-548363. English Translation. Total 4 pages.
Guangqing Zuo et al., "The Trial of the Top Gas Recycling Blast Furnace at LKAB's EBF and Scale-up," Proceedings of the 4$^{th}$ Ulcos seminar, Oct. 1-2, 2008, SP10—Top Gas Recycling Blast Furnace/n°2-3 (6 pages).
International Search Report dated Jun. 12, 2014 issued in corresponding International patent application No. PCT/EP2013/076109.
Written Opinion dated Jun. 12, 2014 issued in corresponding International patent application No. PCT/EP2013/076109.
United Kingdom Search Report dated Apr. 23, 2013 issued in corresponding United Kingdom patent application No. 1223135.3.
United Kingdom Search Report dated Dec. 16, 2013 issued in corresponding United Kingdom patent application No. 1223135.3.
Dr.-Ing. Heinrich Peter; "Heat recovery in blast furnace stove plants"; MPT—Metallurfical Plant and Technology; No. 3; pp. 2-10; XP001408316; 1982; Jan. 1, 1982.

* cited by examiner

PRIOR ART

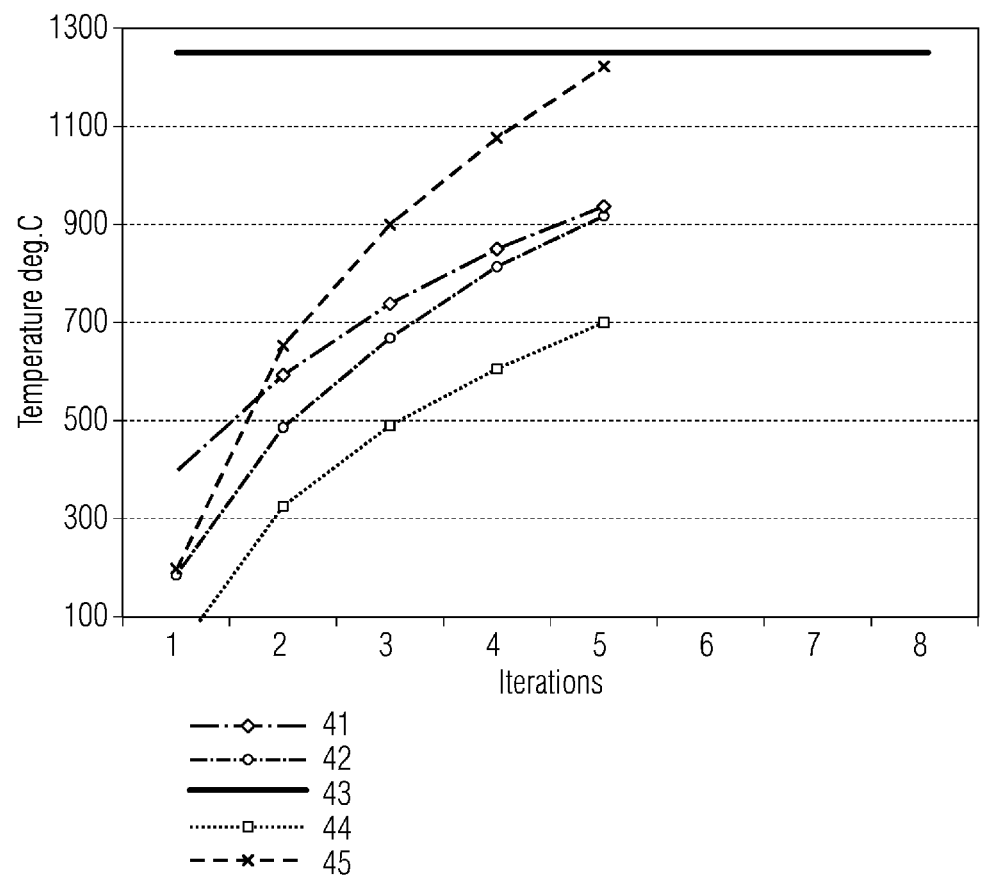

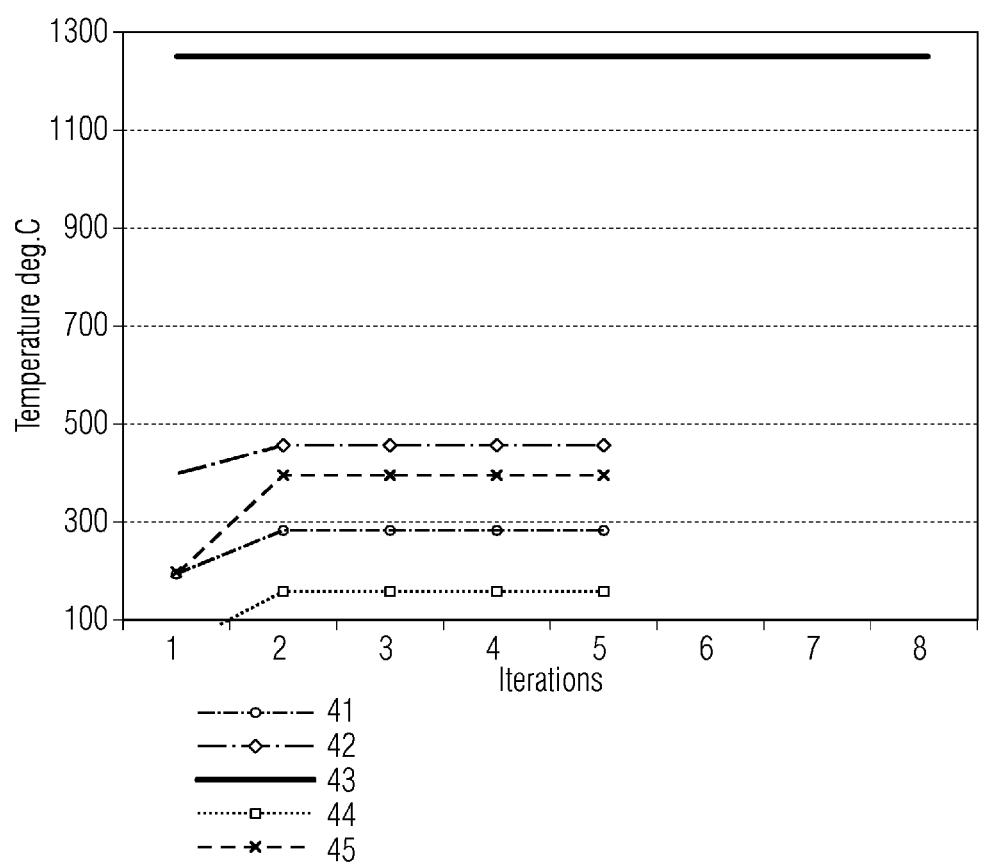

US 9,868,998 B2

METHOD AND APPARATUS FOR SUPPLYING BLAST TO A BLAST FURNACE

CROSS-REFERENCE TO RELATED APPLICATIONS

The present application is a 35 U.S.C. §§371 national phase conversion of PCT/EP2013/076109, filed Dec. 10, 2013, which claims priority of Great Britain Patent Application No. 1223135.3, filed Dec. 21, 2012, the contents of which are incorporated by reference herein. The PCT International Application was published in the English language.

TECHNICAL BACKGROUND

This invention relates to a method and apparatus for supplying blast to a blast furnace.

Conventionally, the use of heated blast air introduces nitrogen to the furnace, which must be removed from the blast furnace top gas if carbon capture and storage are to be used. One approach to the issue of removing nitrogen from the top gas has been described by G. Zuo and A. Hirsch, SP10-Top Gas Recycling Blast Furnace no2-3, Proceedings of $4^{th}$ ULCOS Seminar, 1-2 October 2008. In this article, oxygen is used in place of preheated air and carbon monoxide rich top gas is re-injected into the blast furnace.

U.S. Pat. No. 4,877,013 describes a hot blast stove installation with a plurality of hot blast stoves alternately operating during a heating phase and a blowing phase. A heat exchanger removes heat from cold blast in the cold blast main before supplying cold blast to the stoves.

JP2012031495 describes producing hot blast from a plurality of hot blast furnaces including combustion exhaust gas recirculation.

JP S57137407 describes using a heat exchanger in a regeneration chamber of a hot blast stove.

Peter Heinrich "Heat recovery in blast furnace stove plants", MPT-Metallurgical Plant and Technology, no.3, 1 Jan. 1982 (1982-01-01), page 10, XP001408316 describes using heat recovery from stove waste gases in blast furnace stove plants.

SUMMARY OF THE INVENTION

In accordance with a first aspect of the present invention, apparatus for supplying blast to a blast furnace comprises a plurality of hot blast stoves, each stove comprising a cold blast inlet, a fuel inlet, an air supply inlet, a hot blast outlet, and one or more waste gas outlets; and a waste heat recovery unit connected to a fuel supply, the stove waste gas outlets; the stove fuel inlets and the cold blast inlets; wherein the stove waste gas outlets are connected to the cold blast inlets via a compressor, whereby stove waste gas from one stove is supplied, via the waste heat recovery unit and the compressor, as cold blast to another stove.

In use, the waste gas outlet of one stove which is on gas is connected to the cold blast inlet of another stove which is on blast and supplies the waste gas, via the heat recovery unit, to the cold blast inlet, as cold blast.

Preferably, the apparatus further comprises a waste gas vent between the heat recovery unit and the cold blast inlets.

Preferably, the apparatus further comprises a waste gas fan operating below blast pressure. The waste gas fan may be positioned between the stove waste gas outlet and the heat recovery unit, but preferably the waste gas fan is positioned between the heat recovery unit and the cold blast inlets. This simplifies manufacturing, as the fan does not have to tolerate such high temperatures.

Preferably, the compressor is situated between the fan and the cold blast inlets.

Preferably, the apparatus further comprising a CO regenerator to regenerate CO from the blast before it enters the blast furnace.

The regenerator may be positioned between the compressor and the cold blast inlets to regenerate CO from the cold blast, but preferably the regenerator is positioned between the hot blast outlet and the blast furnace.

Preferably, the apparatus further comprises a blast furnace and a connection between the blast furnace and the heat recovery unit to transfer clean recycled top gas to the heat recovery unit.

Preferably, the apparatus further comprises a supply of oxygen between the waste gas fan and the stove air supply inlets.

In accordance with a second aspect of the present invention, a method of supplying blast to a blast furnace comprises extracting stove waste gas from a first hot blast stove; cooling the waste gas in a waste heat recovery unit; pressurising the cooled gas; supplying the cooled pressurised waste gas to a second hot blast stove as cold blast; heating the cold blast in the second stove and supplying the heated cold blast as hot blast to the blast furnace.

Preferably, the method further comprises supplying cleaned top gas from the blast furnace to the heat recovery unit to heat the cleaned top gas in the waste heat recovery unit with the heat from cooling the stove waste gas; and supplying the heated cleaned top gas to a stove as fuel.

Preferably, the method further comprises separating the cooled waste gas into two streams; supplying oxygen to a first stream and supplying the oxygenated stream to a first stove as an air source; and compressing a second stream and supplying the second stream to a second stove as cold blast.

Preferably, the method further comprises the regeneration of CO from the blast before it enters the blast furnace.

BRIEF DESCRIPTION OF THE DRAWINGS

An example of a method and apparatus according to the present invention will now be described with reference to the accompanying drawings in which:

FIG. 5 illustrates the operation of the system of FIG. 2 or FIG. 3, without a waste heat recovery unit; and, FIG. 6 illustrates operation of the system of FIG. 2, 3, or 4, with a waste heat recovery unit.

DESCRIPTION OF AN EMBODIMENT

The present invention may use the waste gas from the stoves as an alternative source of hot blast for the blast furnace. By replacing traditional blast air with waste gas from the stove combustion process, which is readily available on site, nitrogen content in the top gas is reduced and the carbon dioxide content of the final gas exported from the blast furnace is increased, making it more suitable for carbon capture and storage, (carbon capture and sequestration). Oxygen may be added to the cold blast stream in order to burn coke in the furnace.

Figure 1:
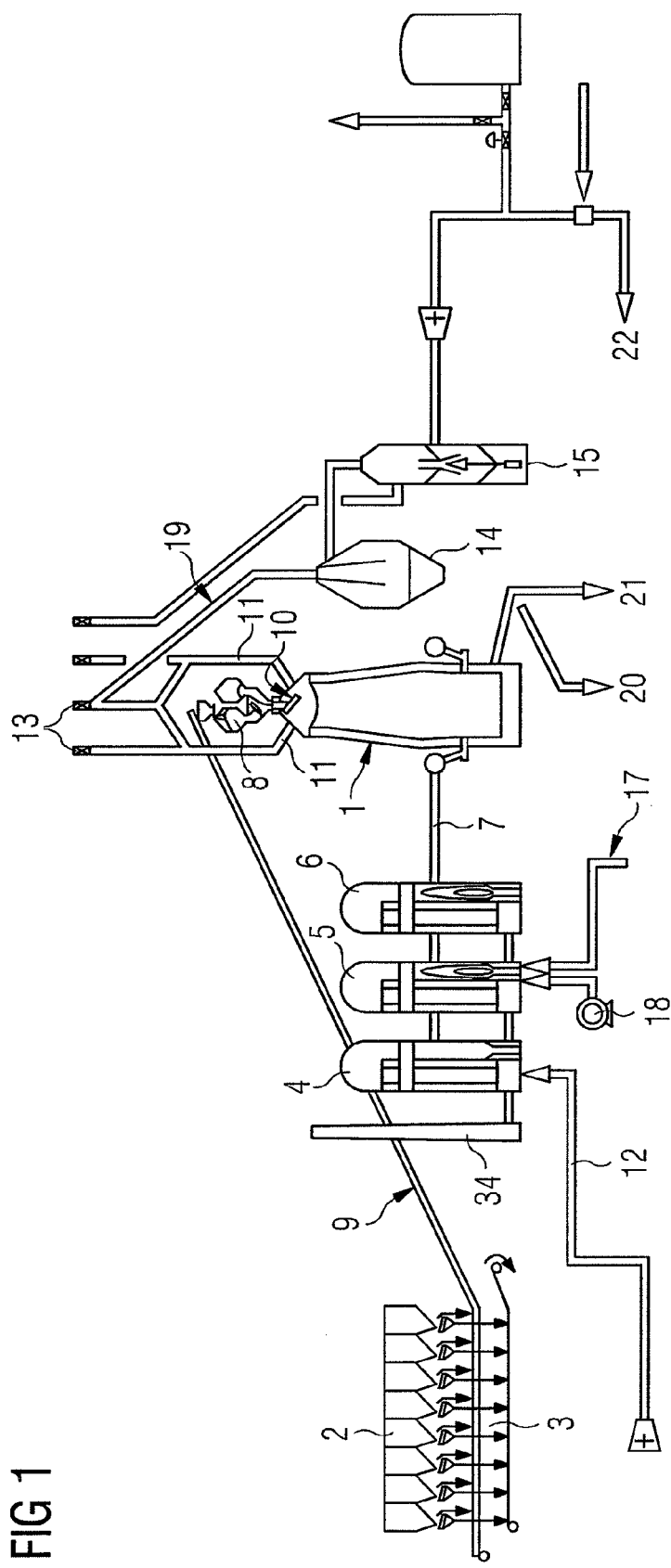
FIG. 1 illustrates operation of a conventional blast furnace plant.

FIG. 1 illustrates a conventional blast furnace plant including a blast furnace 1, a supply mechanism 2, 3, 9 to supply material to the blast furnace and a series of hot blast stoves 4, 5, 6 to supply hot blast for the blast furnace. The hot blast stoves may be internal or external combustion stoves. At any time, one stove, in this example stove 4 is on blast and at least one of the other stoves 5, 6 is on gas. When the first stove finishes being on blast, then a controller switches to the next stove ready to go on blast, but for simplicity, not all the lines and connections are shown in this figure. Fuel is supplied 17 to the stoves 5, 6 which are on gas along with air from a fan 18.

The required materials, including iron ore and coke, are supplied from hoppers 2 in controlled amounts and in order, through weighing devices 3 in a stockhouse (not shown) to a charging mechanism 8 at the top of the furnace, for example via a conveyor belt 9. When a charge of material is released into the furnace 1 it falls downwards and undergoes various chemical reactions before reaching the bottom of the furnace. When the coke meets hot blast air 7 supplied from a position near to the bottom of the furnace, this generates heat. Iron and slag result from the various chemical reactions and are removed from the furnace by tapping the furnace and causing the iron 20 and slag 21 to flow over a dam (not shown) to separate the heavier molten iron from the molten slag and remove them separately for further processing away from the casthouse.

The furnace 1 is provided with a furnace top valve 10 to close the furnace off from the charging mechanism and various offtakes 11 to direct the top gases resulting from the reactions in the furnace to a downcomer 19. Bleeder valves 13 are provided to allow top gases to vent from the blast furnace to protect the furnace top from sudden gas pressure changes. Top gases pass through the downcomer 19, a dustcatcher, or cyclone 14 and a venturi scrubber 15 to clean them of particulate matter. The cleaned blast furnace top gas, which may contain nitrogen, carbon dioxide and carbon monoxide, is used in the stove combustion process, with the combustion air 18 in the stove. The cleaned top gas is returned 22, 17 to the hot blast stoves 5, 6 for combustion in order to heat the stoves. A refractory lining of each stove on gas is heated by the combustion of the cleaned gas. The stove on blast receives air via a cold blast main 12 and this air takes up the heat from the refractory lining to produce hot blast 7, which is fed into the blast furnace 1, near to the bottom. In the process of heating the stoves, during the on gas phase, waste gases are generated. These waste gases are then vented through a chimney stack 34.

Figure 2:
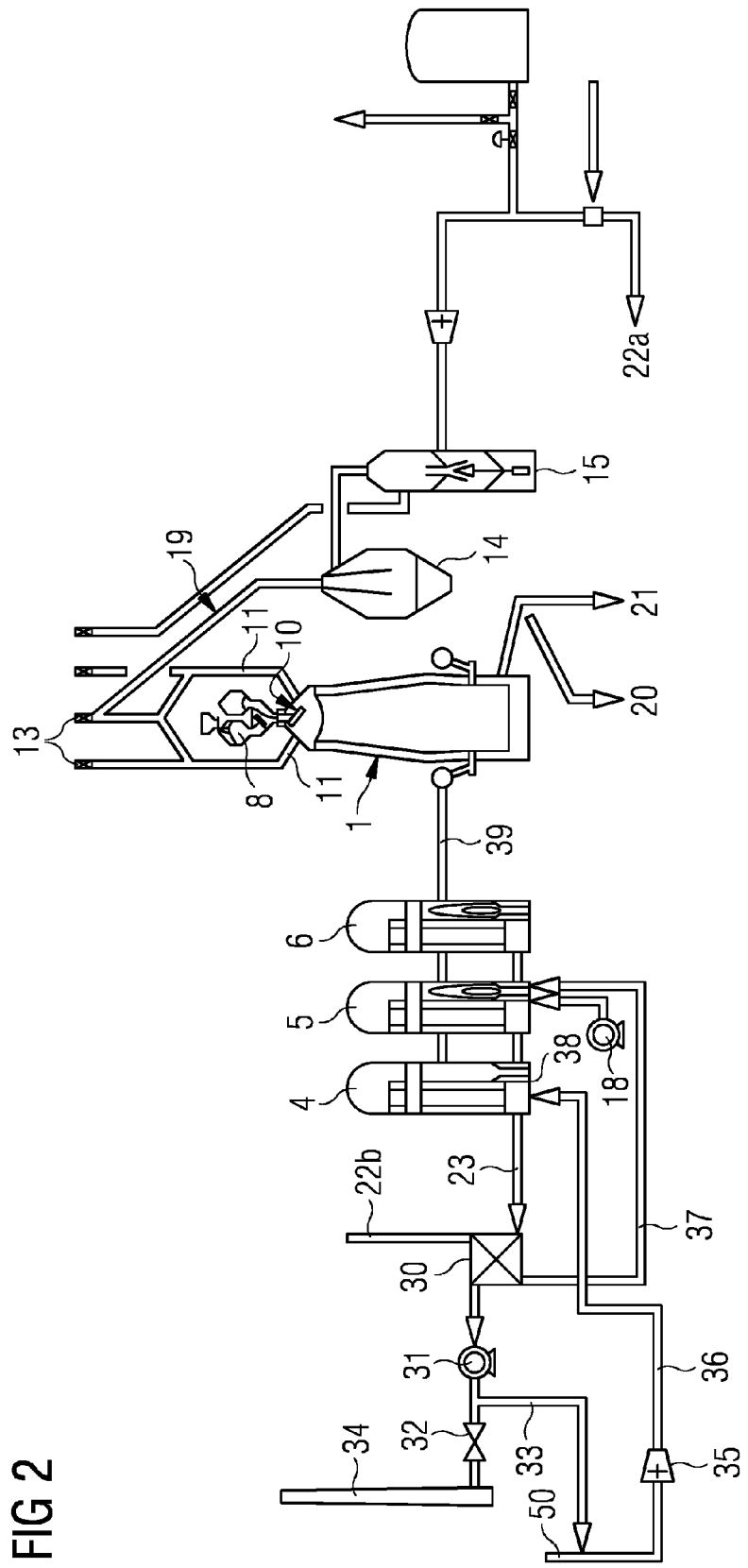
FIG. 2 illustrates a first embodiment of a blast furnace plant adapted according to the present invention.

In order to reduce the amount of waste gas vented to atmosphere and to use resources more efficiently, one embodiment of the present invention modifies the conventional blast furnace plant in a number of ways, as illustrated in FIG. 2. Instead of simply venting 34 all waste gases from the stove combustion cycle, the stove waste gas 23 is first used in a gas to gas heat exchanger 30 to recover waste heat. The cleaned blast furnace top gas 22b is heated by the heat exchanger and the heated blast furnace top gas 37 is used in combustion in the stove 5 with air from fan 18. The effect of passing through the heat exchanger 30 is to cool the stove waste gas 23 and at least some of the cooled gas is then directed by waste gas fan 31 operating at a relatively low pressure, i.e. below blast furnace pressure, (typically the fan has an outlet pressure below 0.5Kg/cm$^2$) to a furnace blast blower/compressor inlet 35 which pressurises the cooled waste gas 33 to blast pressure and provides pressurised gas 36 to an inlet 38 of the stove 4 which is on blast. The temperature of the stove waste gas is below 200 degrees C, perhaps even below 150 degrees C. after passing through the heat exchanger. Although the fan 31 could be provided between the stove waste gas outlet and the heat exchanger, this would be more expensive and complicated in manufacturing terms because the gas is still hot, up to 400° C., at this point and the fan would need to be able to withstand these temperatures. Control valves (not shown) control the amount and timing of the gas supply. By cooling the waste gas in the heat exchanger, it is possible to get a fixed, or predetermined, temperature of cold blast 36 from which, by heating in the stove in the normal way, hot blast 39 at a desired temperature is obtained. Cooling in the heat exchanger 30 also ensures that the gas 33 entering the blower 35 is not at a temperature which would cause damage to the blower. A valve 32 controls the amount of waste gas 33 being sent to the blower/compressor 35, or vented 34. At the start of production the waste gas 33 is not usable and must be vented 34 during which time the compressor 35compresses ambient air 50 to generate cold blast 36. Overall emissions are reduced by not venting all of the waste gas to the chimney 34. The piping in the plant is adapted to deal with the cold blast derived from the stove waste gas being slightly acidic.

The hot blast generated in this way contains nitrogen and carbon dioxide and may also be enriched with oxygen, but the blast has a higher carbon dioxide content and lower nitrogen content than using only air blast, so that the carbon dioxide content in the final export gas is higher and therefore more suitable for carbon capture, carbon sequestration. In addition, by starting with some carbon dioxide content in the blast gas, the amount of raw carbon required in the furnace reactions may be reduced. The carbon rich blast gas may also result in a stronger heating gas when the carbon dioxide rich top gas is reused for combustion, so the amount of enrichment gas may be reduced. In some cases, the proportion of hot blast which is created by this mechanism may be controlled and combined with air blast to obtain the desired properties of the blast gas. Some carbon dioxide may be bled off to chimney 34 via valve 32, as described above and existing cracking or carbon capture used to strip out carbon dioxide.

Figure 3:
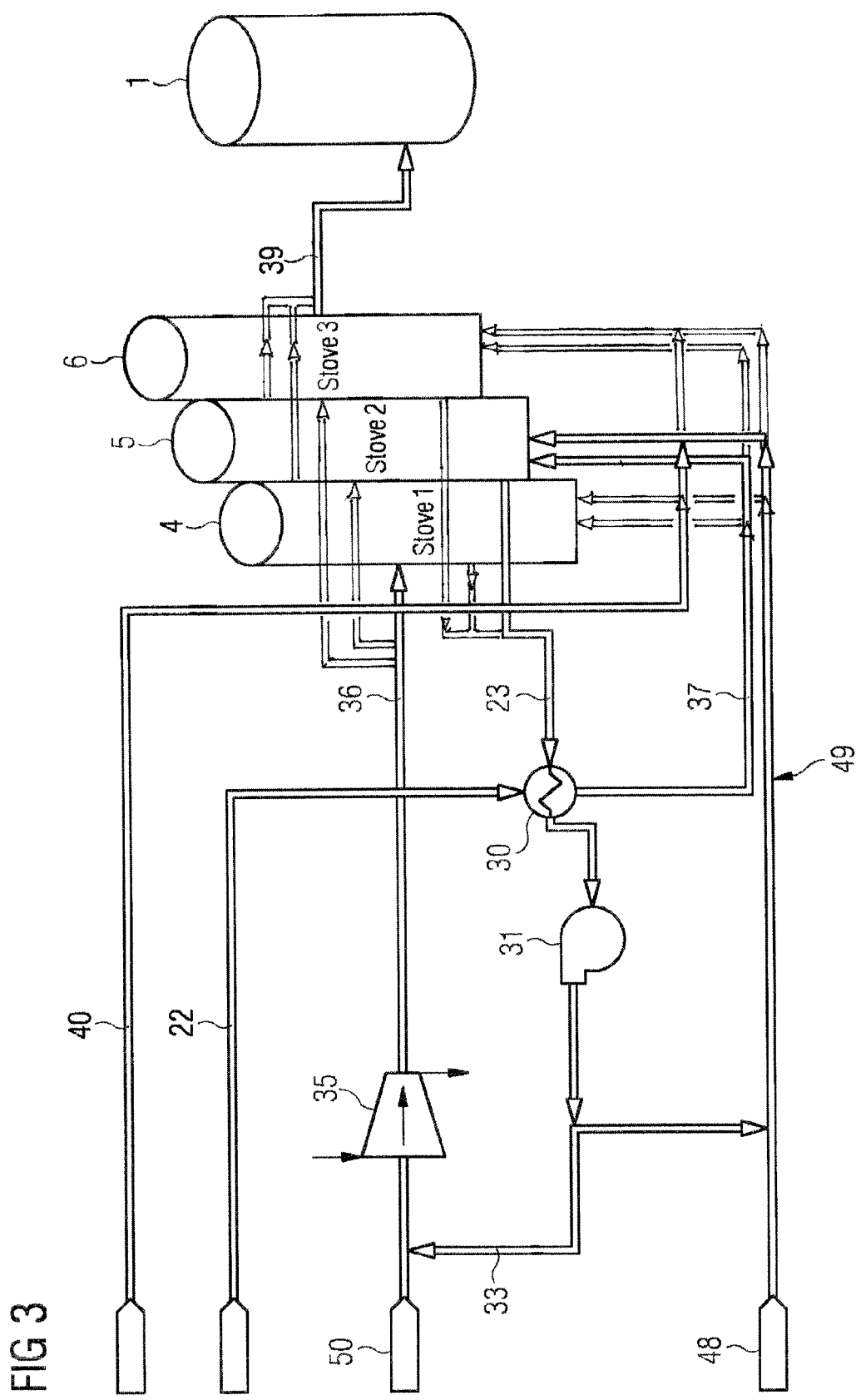
FIG. 3 illustrates an alternative embodiment of a blast furnace plant adapted according to the present invention.

A further embodiment using stove waste gas as blast is illustrated in FIG. 3. In addition to using stove waste gas 23 as blast gas 36, a part of the stove waste gas stream after cooling in the heat exchanger 30 may be used as a carrier 49 for pure oxygen 48 to be added to the blast furnace top gas 37 for combustion in the stoves. Initially, combustion air 40 is supplied when production starts, but this is discontinued when the blast furnace top gas 37 comes into operation. In this example, stove no.2 is on gas and once available, the blast furnace top gas 37, which has passed through the heat exchanger 30, is input directly to the stove 5. Some stove waste gas 23, after passing through the heat exchanger 30 and waste gas fan 31 is directed to the input of the stove 5 and some of the stove waste gas passes through blower/compressor 35 providing pressurised gas for cold blast 36 to be heated in the on blast stove 4. Until stove waste gas starts being generated and there is sufficient stove waste gas to recycle, ambient air or cold blast 50 is compressed by compressor 35 and supplied to the on-blast stove. Hot blast 39 is fed to the blast furnace as before.

Figure 4:
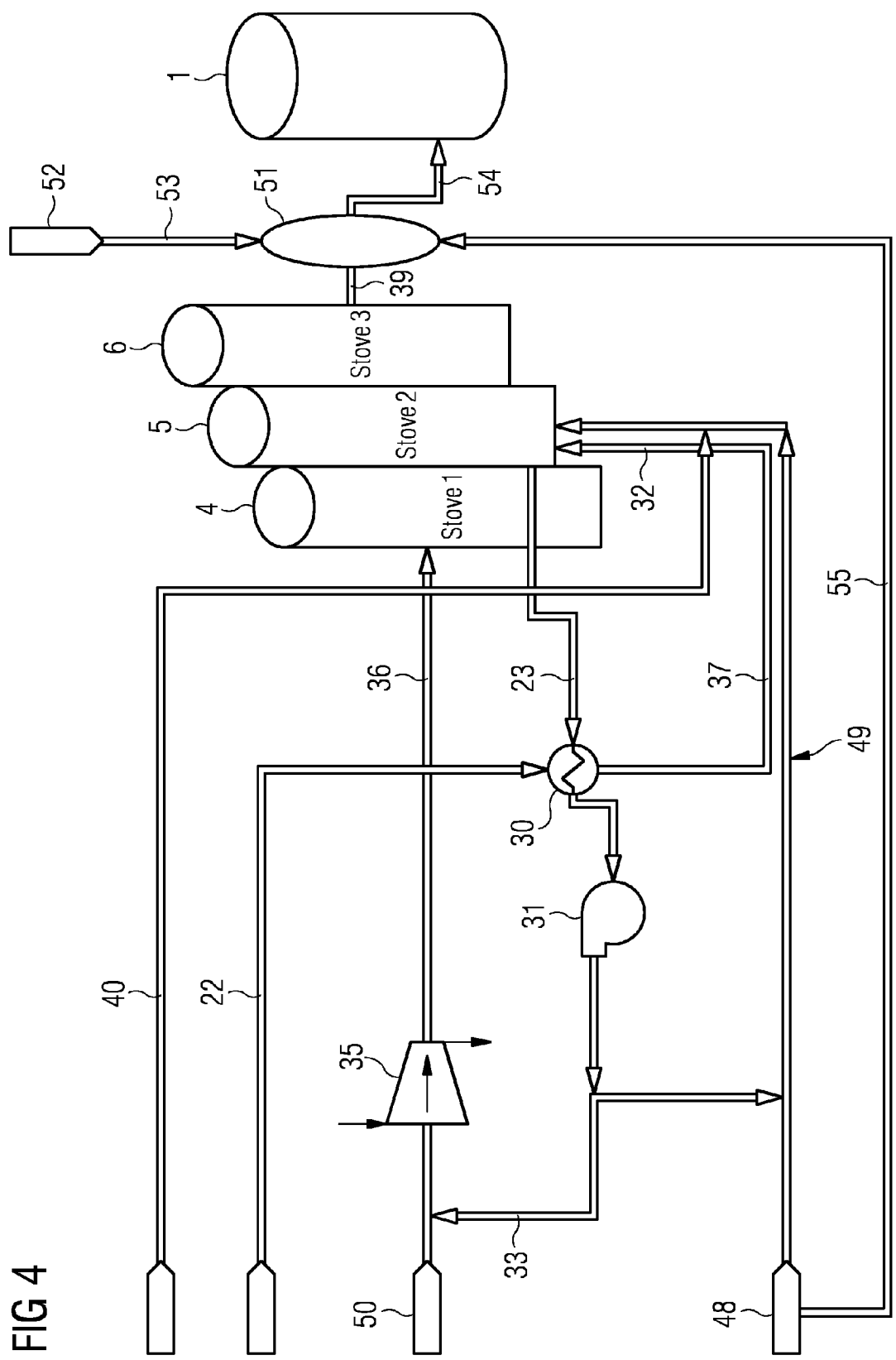
FIG. 4 illustrates the embodiment of FIG. 3 modified to include regeneration of carbon dioxide from the stove waste gas.

A further feature which may be used in combination with the embodiments of the present invention shown in FIGS. 2 and 3 is to carry out regeneration of carbon dioxide from the stove waste gas which is being used as blast to the blast furnace, prior to entering the furnace at the hearth tuyere level. This is illustrated in FIG. 4. The carbon dioxide stream is a replacement for the conventional hot blast from ambient air. A regenerator 51 is provided between the stoves 4, 5, 6 and the furnace 1 to process the hot blast 39 that has been generated from stove waste gas. This hot blast contains carbon dioxide. $CO_2$ is extracted from the hot blast, then the pressurized, heated carbon dioxide stream is combusted with a carbonaceous fuel 52, such as coal, in a pressurised vessel with oxygen 48 to regenerate carbon monoxide 54, by burning the $CO_2$ down to CO, resulting in a CO reductant gas stream 54 prior to transport to the blast furnace bustle pipe, the hearth tuyere inlet. The reductant gas stream goes into the furnace directly, rather than being made in the furnace. As a result, it is possible to save on the amount of raw carbon required in the furnace reactions. Hot pressurized carbon monoxide is created at the furnace bosh, the section between the hearth and the vertical shaft that extends to the top of the furnace, without reacting coke in the blast furnace.

Coke may still need to be added into the furnace, as may oxygen, so regenerated CO is not a total replacement for coke at the Tuyere level. It may be desirable to control the level of oxygen before the furnace to prevent fires before the furnace. A few percent of $CO_2$ may be left in the hot blast stream. Other than at start up, as described above, which may be for as much as a week, there is no need for the stoves waste gas 23 to be vented through the chimney 34, saving $CO_2$ emissions. Although recycling of furnace top gas and regeneration of the CO from the stove waste gas is not 100% efficient, less new carbon is required on the furnace, so the Kg/tonne required in the production of iron is reduced.

As illustrated in FIG. 4, regeneration of CO includes fuel 52 supplied via line 53 to the regenerator 51 and oxygen 48 supplied to the regenerator via line 55. Hot blast 54, after passing through the regenerator 51, is input to the blast furnace 1. It will be understood that for simplicity, not all connections are shown, nor are all lines in operation at every stage of the process. In this example, the regenerator 51 is shown between the outlet of the hot blast stoves and the blast furnace 1. The benefit of this position is that the process is more efficient when carried out on hot blast 39. As an alternative, the regenerator may be positioned after the compressor 35 before the inlet to the stoves. The waste gas (23) from the stoves (4, 5, 6) contains the $CO_2$ and this passes through the heat exchanger (30) and goes to the compressor (35). With the regenerator between the compressor (35) and the blast furnace (1) the regenerator is still able to convert the $CO_2$ back to CO. The benefit of this position is the design temperature of the equipment comprising the regenerator is less than is required if the regenerator operates on hot blast. Although not shown in the figures, the embodiment of FIG. 2 may also be modified to include a regenerator in either of the positions mentioned above.

The use of stoves stove waste gas as blast and regeneration of CO are features which can be retro-fitted to sites with existing stoves by adding in waste heat recovery, a fan and a regeneration stage.

FIGS. 5 and 6 illustrate the effect of using waste heat recovery on heat balance and the temperature of specific components and gas flows. The FIG. 5 results are for a conventional plant and the FIG. 6 results for a plant using waste heat recovery.

In both figures, 41 is cold blast temperature in ° C.; 42 is stove waste gas temperature in ° C.; 43 is hot blast temperature in ° C.; 44 is blower input temperature; and 45 is blower output temperature. In FIG. 5, no heat recovery is applied, which is the case in a conventional plant, such as FIG. 1 and it can be seen that the temperatures rise quickly to a level not far off that of the hot blast. In FIG. 6, waste heat recovery, such as described with respect to FIGS. 2, 3 and 4, is present and after a limited rise, the temperatures flatten out, so that the cold blast is at a substantially constant temperature, well below that required for the hot blast.

The invention claimed is:

1. An apparatus for supplying blast to a blast furnace, the apparatus comprising:
    a plurality of hot blast stoves, each stove comprising a cold blast inlet, a fuel inlet, an air supply inlet, a hot blast outlet, and one or more waste gas outlets;
    a waste heat recovery unit connected to a fuel supply, connected to the stove waste gas outlets, directly connected to the stove fuel inlets and connected to the cold blast inlets; and
    a compressor connecting the stove waste gas outlets to the cold blast inlets, whereby stove waste gas from one stove is supplied, via the waste heat recovery unit and the compressor, as cold blast to another stove.

2. The apparatus according to claim 1, further comprising a waste gas vent between the waste heat recovery unit and the cold blast inlets.

3. The apparatus according to claim 1, further comprising a waste gas fan between the waste heat recovery unit and the cold blast inlets.

4. The apparatus according to claim 3, wherein the compressor is connected between the waste gas fan and the cold blast inlets.

5. The apparatus according to claim 3, further comprising a supply of oxygen between the waste gas fan and the stove air inlets.

6. A system comprising the apparatus according to claim 1, a blast furnace, and a connection between the blast furnace and the waste heat recovery unit configured to transfer recycled top gas from the blast furnace to the waste heat recovery unit.

7. An apparatus for supplying blast to a blast furnace, the apparatus comprising:
    a plurality of hot blast stoves, each stove comprising a cold blast inlet, a fuel inlet, an air supply inlet, a hot blast outlet, and one or more waste gas outlets;
    a waste heat recovery unit connected to a fuel supply, the stove waste gas outlets, the stove fuel inlets and the cold blast inlets;
    a compressor connecting the stove waste gas outlets to the cold blast inlets, whereby stove waste gas from one stove is supplied, via the waste heat recovery unit and the compressor, as cold blast to another stove; and
    a CO regenerator located and configured to regenerate CO from $CO_2$ in the hot blast outlet of one of the stoves before the hot blast enters the blast furnace.

8. The apparatus according to claim 7, wherein the CO regenerator is positioned between the hot blast outlet of the one stove and the blast furnace.

9. A method of supplying blast to a blast furnace, comprising:
    extracting stove waste gas from a first hot blast stove;
    cooling the extracted waste gas in a waste heat recovery unit; and
    pressurising the cooled gas; supplying the cooled pressurised waste gas to a second hot blast stove as cold blast; heating the cold blast in the second stove and supplying the heated cold blast as hot blast to the blast furnace, wherein the waste heat recovery unit is directly connected to fuel inlets of the first hot blast stove and the second hot blast stove.

10. The method according to claim 9, further comprising separating the cooled waste gas into two streams;

supplying oxygen to a first of the streams and supplying the oxygenated stream to a first stove air supply inlet as an air supply; and compressing a second one of the streams and supplying the second stream to a second stove as cold blast.

11. The method according to claim 9, further comprising regenerating CO from $CO_2$ in the hot blast before the hot blast is supplied to and enters the blast furnace.

12. A method of supplying blast to a blast furnace, comprising:

extracting stove waste gas from a first hot blast stove;

cooling the extracted waste gas in a waste heat recovery unit;

pressurising the cooled gas; supplying the cooled pressurised waste gas to a second hot blast stove as cold blast; heating the cold blast in the second stove and supplying the heated cold blast as hot blast to the blast furnace; and supplying cleaned top gas from the blast furnace to the waste heat recovery unit to heat the cleaned top gas in the waste heat recovery unit using the heat from cooling the stove waste gas; and supplying the heated cleaned top gas to a stove as fuel.

* * * * *